Sept. 17, 1940.     T. McCOY ET AL     2,215,011
MACHINE FOR MAKING, FILLING, AND SEALING PACKAGES
Filed March 9, 1938     13 Sheets-Sheet 2
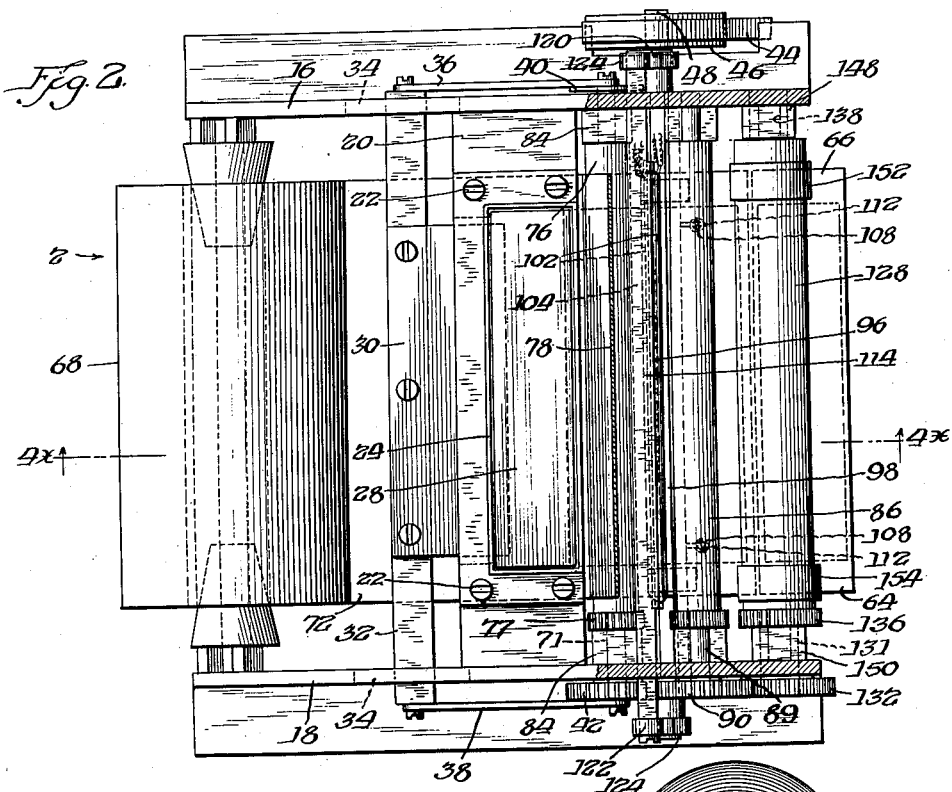
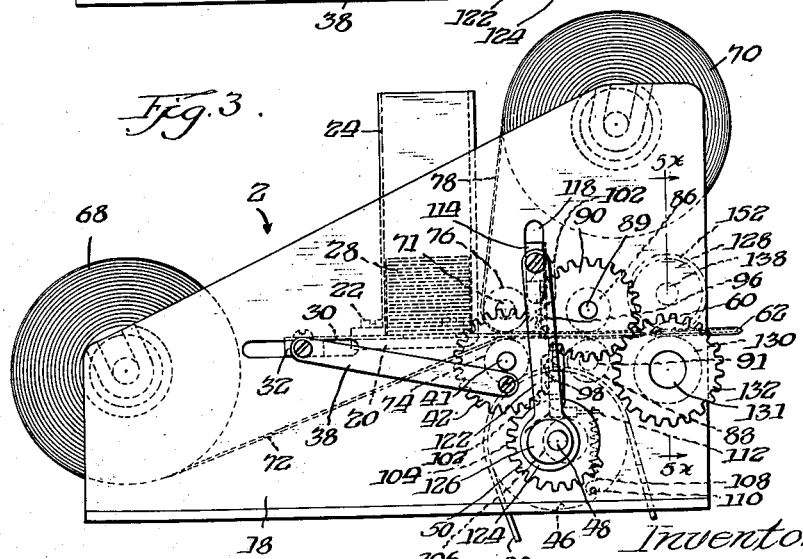

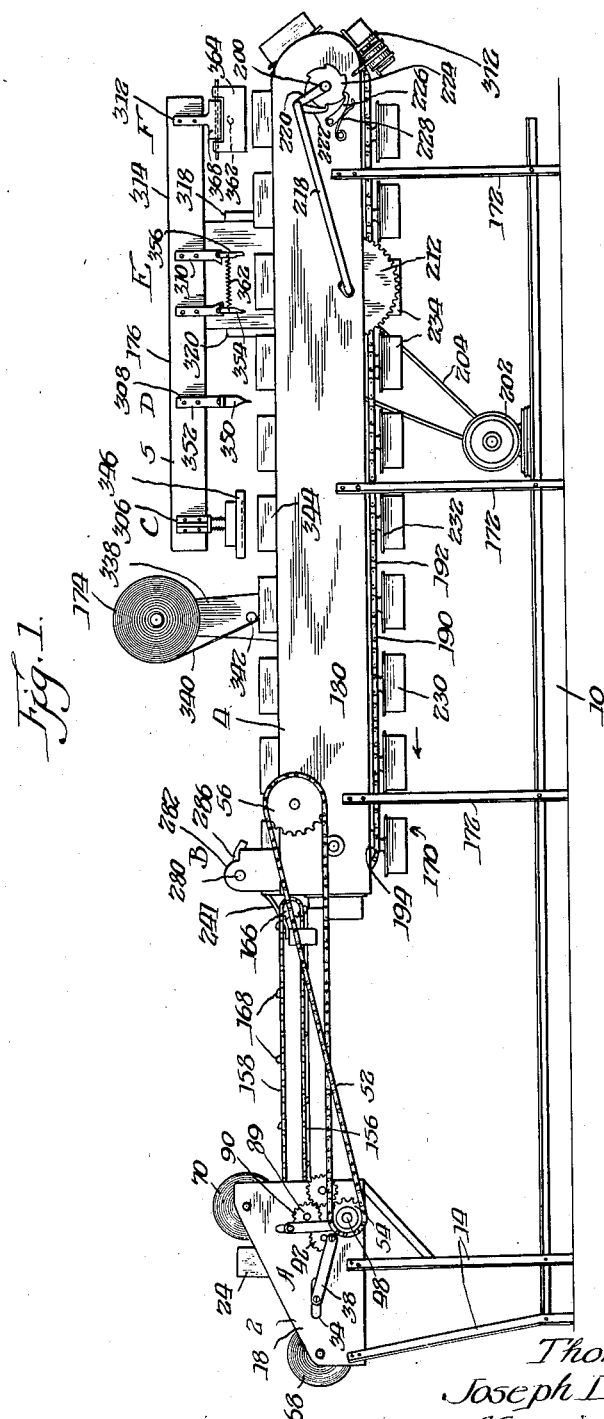

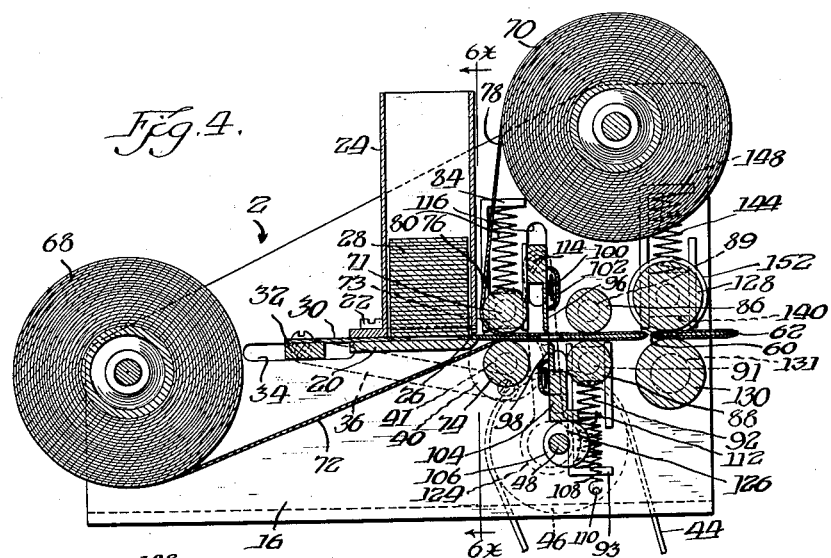

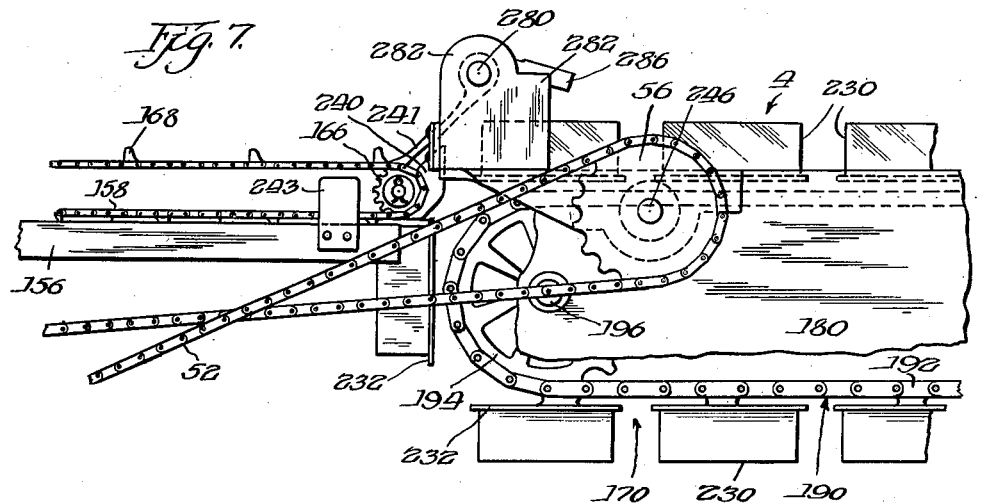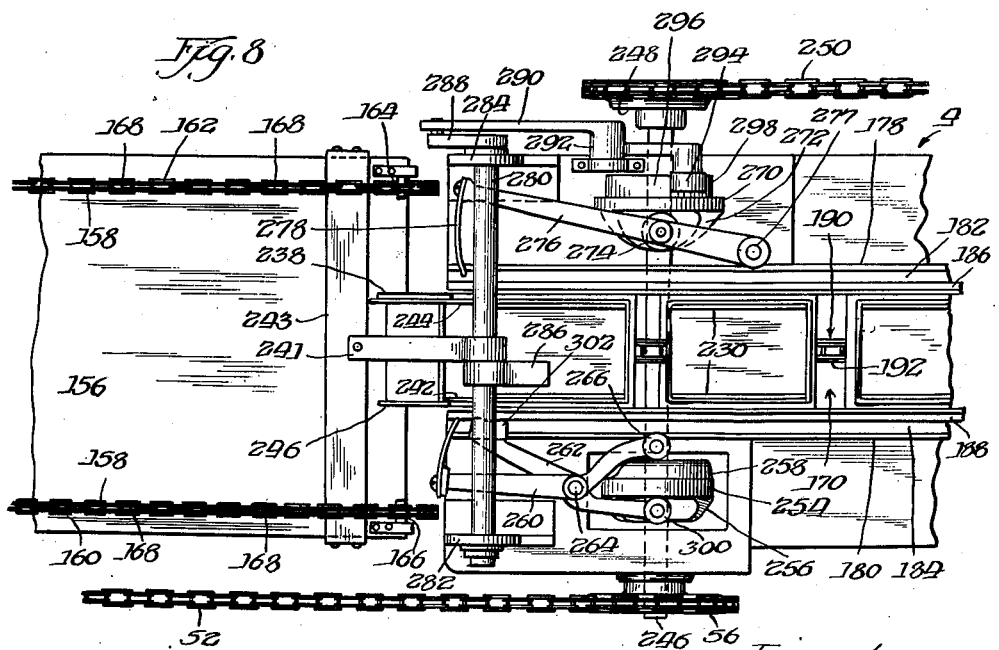

Sept. 17, 1940.  T. McCOY ET AL  2,215,011
MACHINE FOR MAKING, FILLING, AND SEALING PACKAGES
Filed March 9, 1938  13 Sheets-Sheet 5
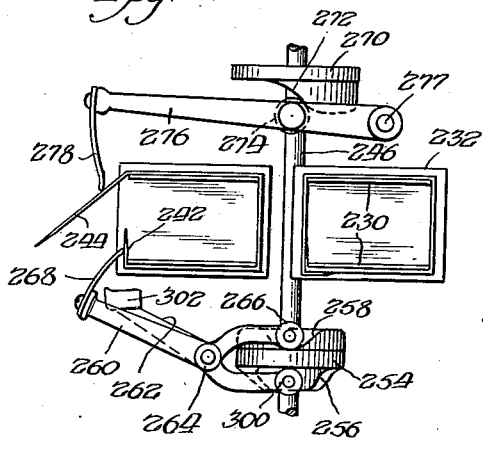
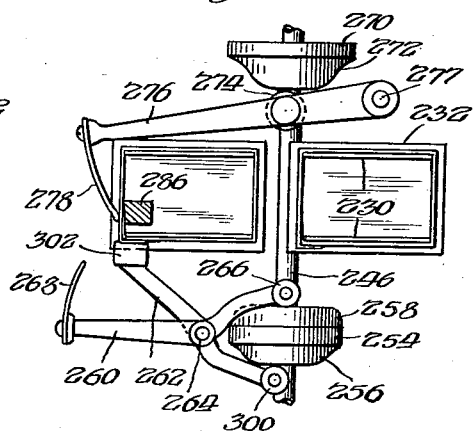
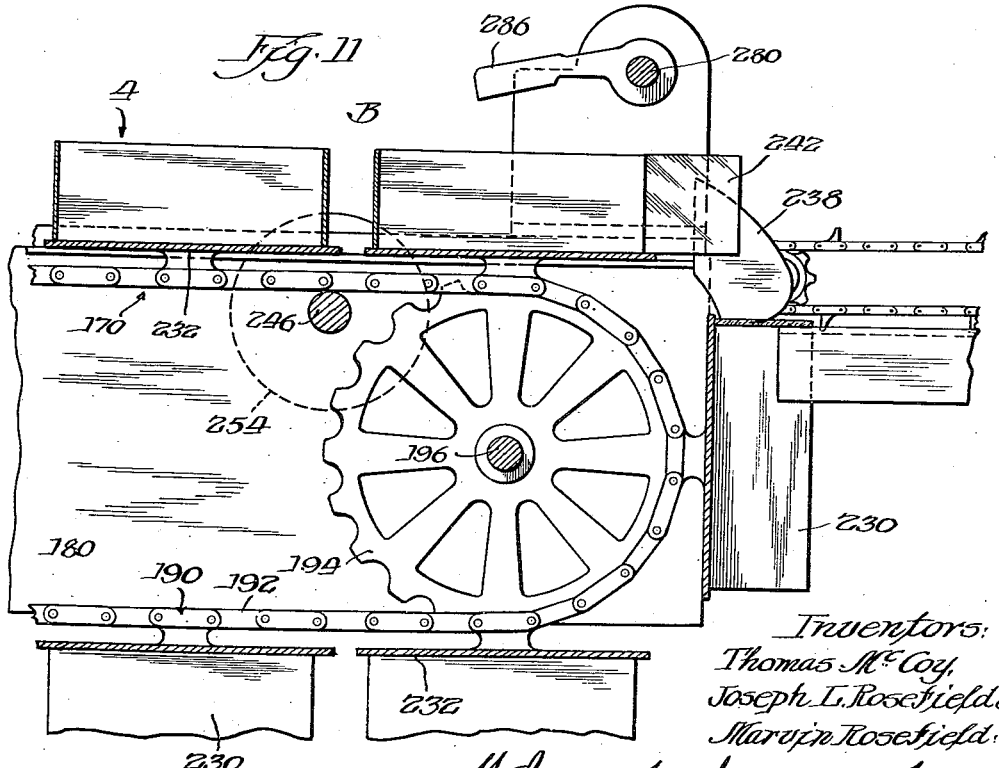

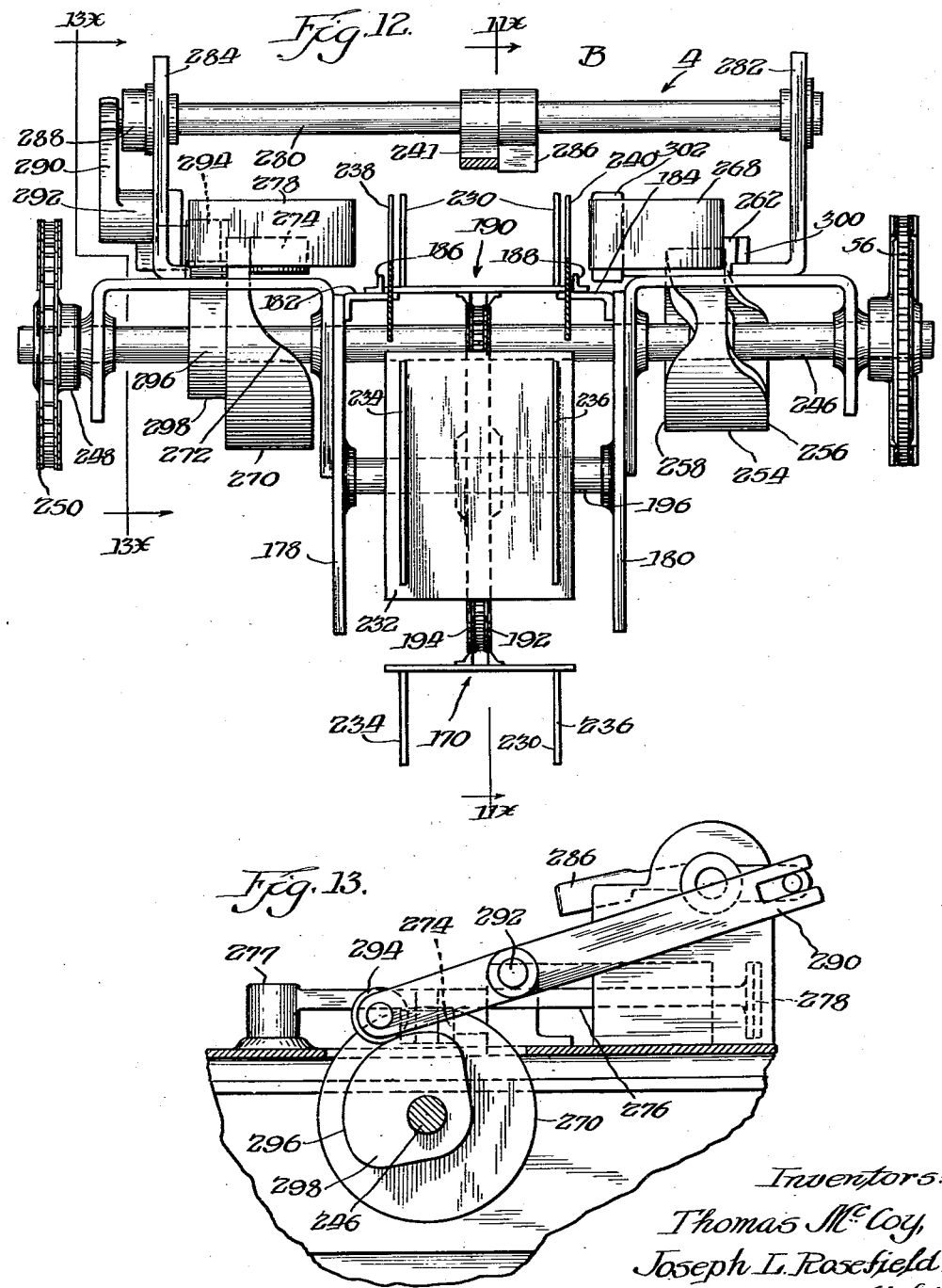

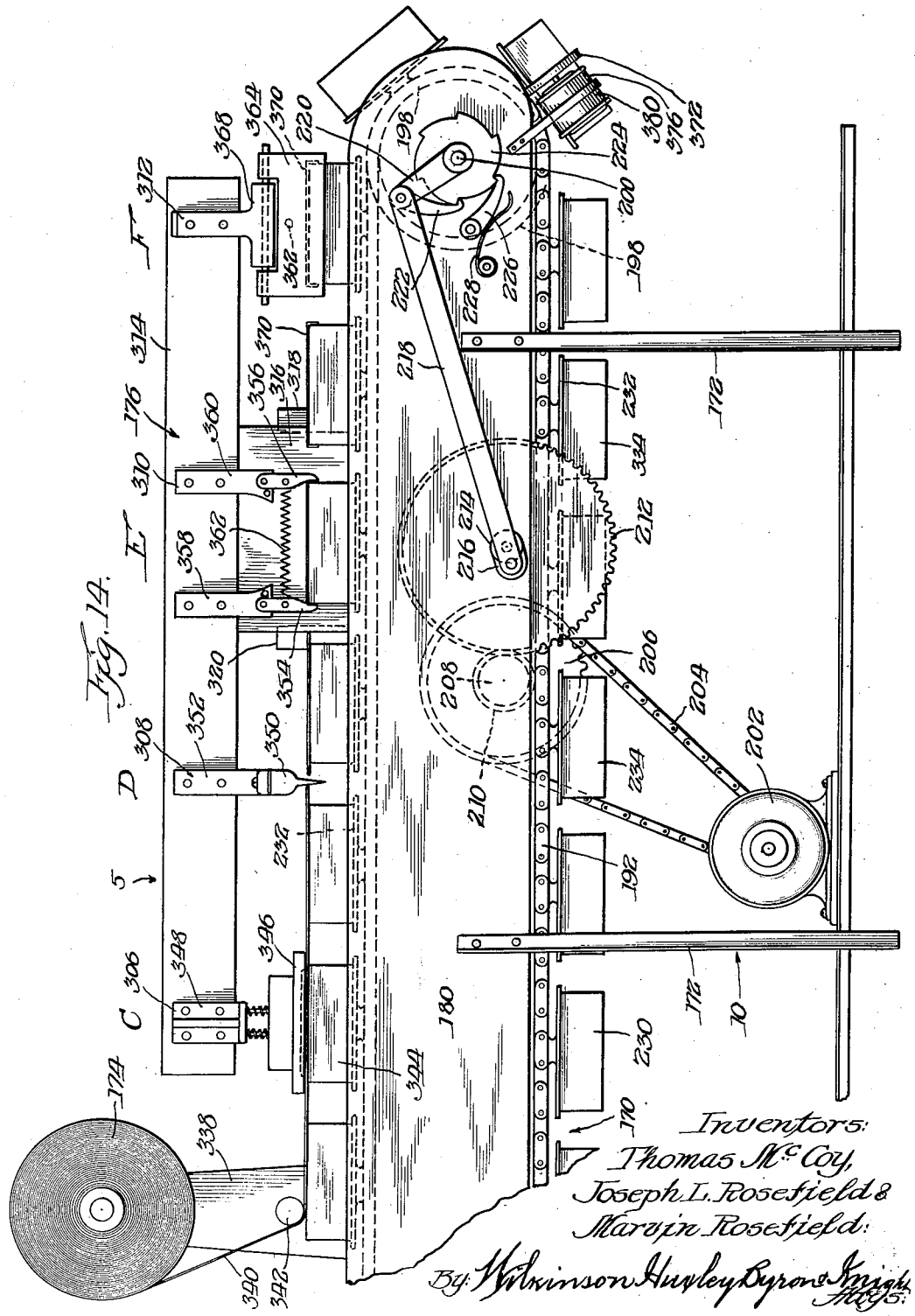

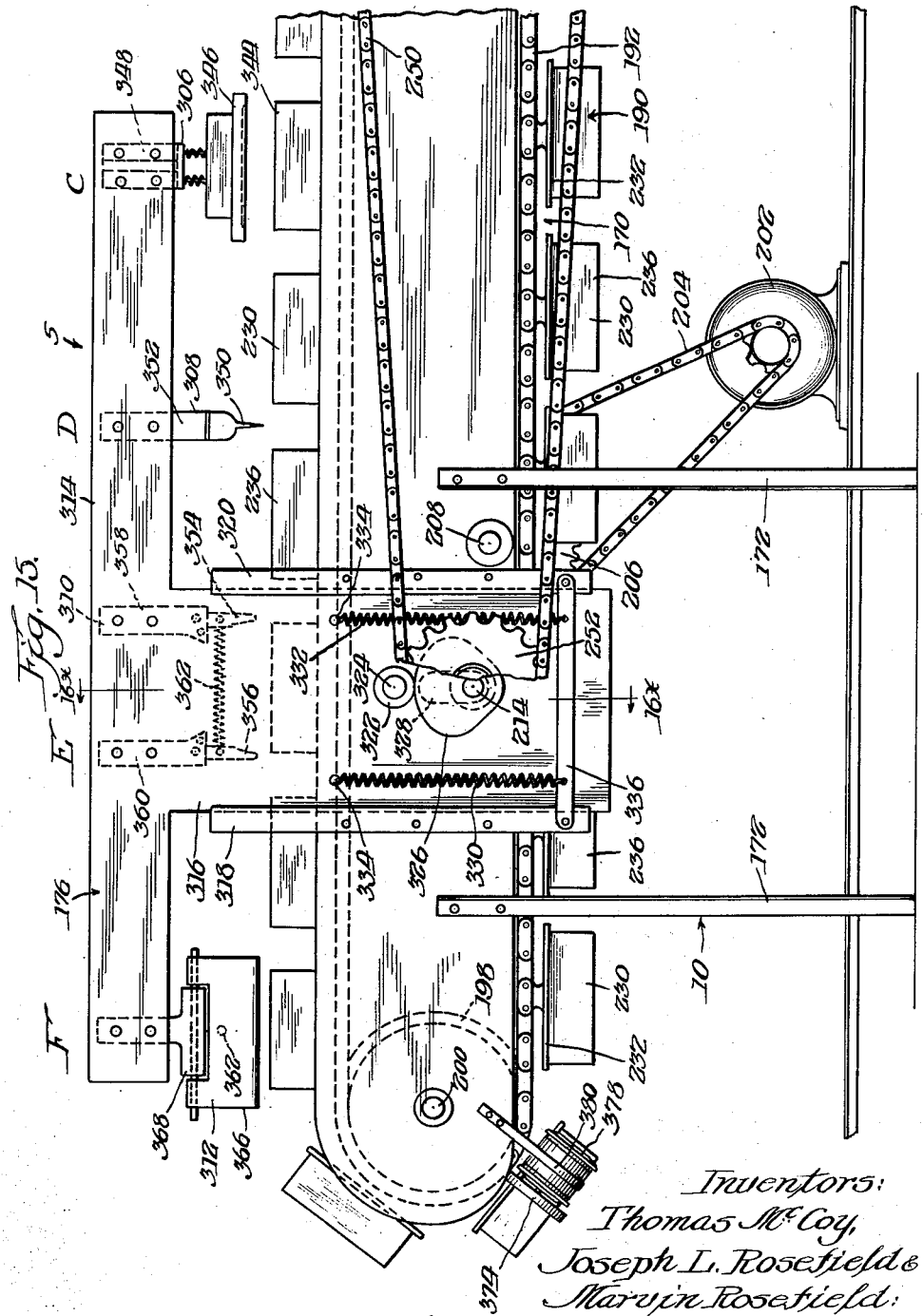

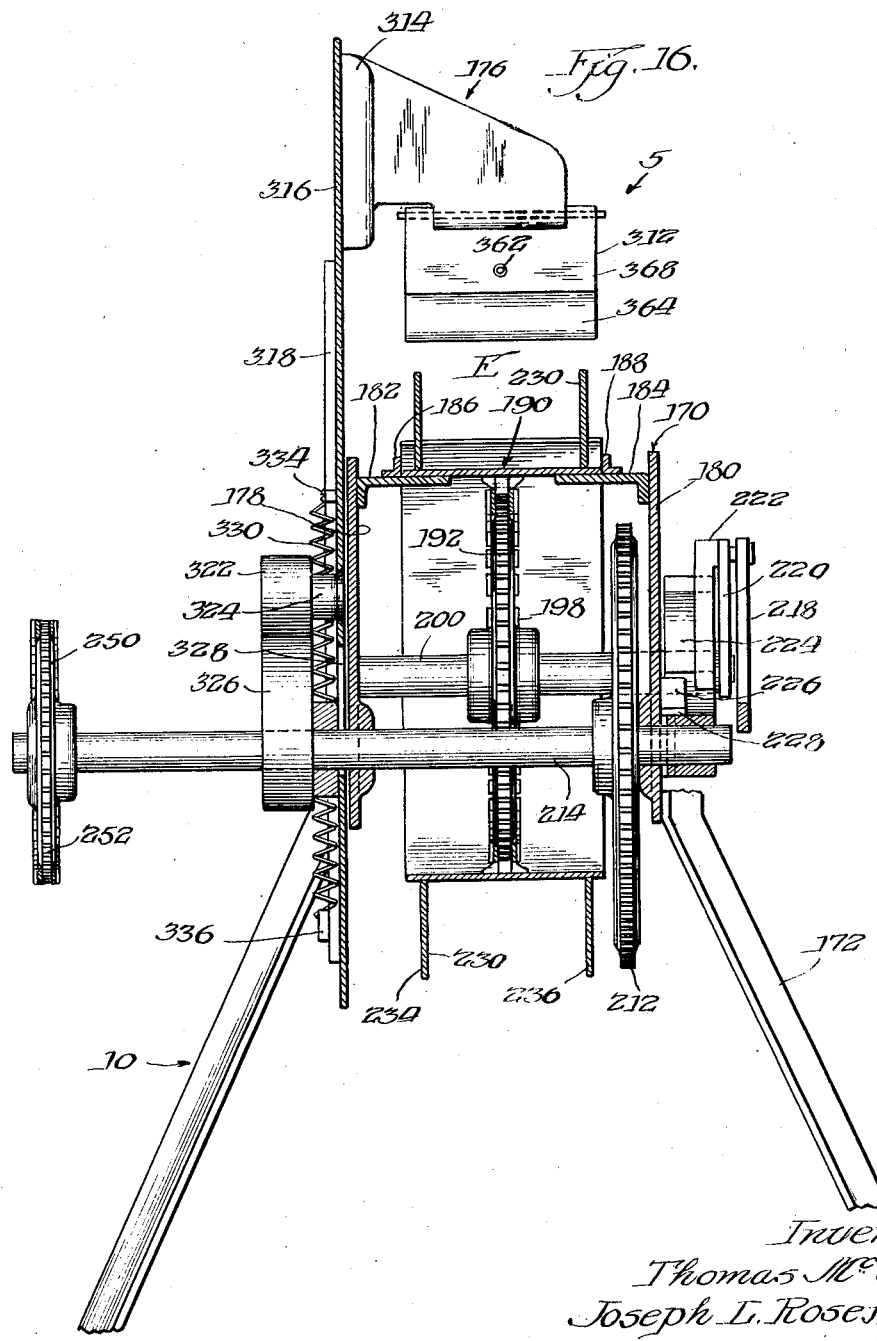

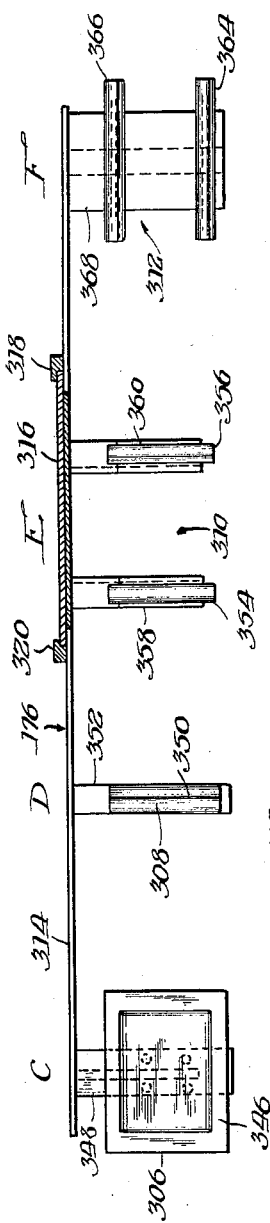

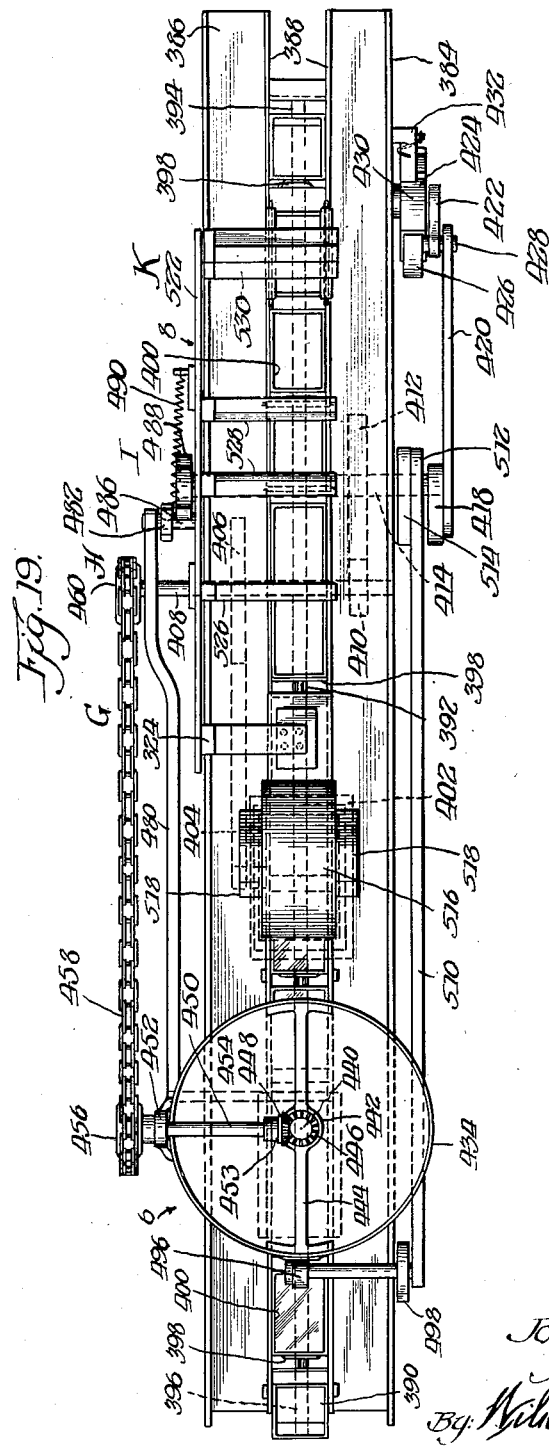

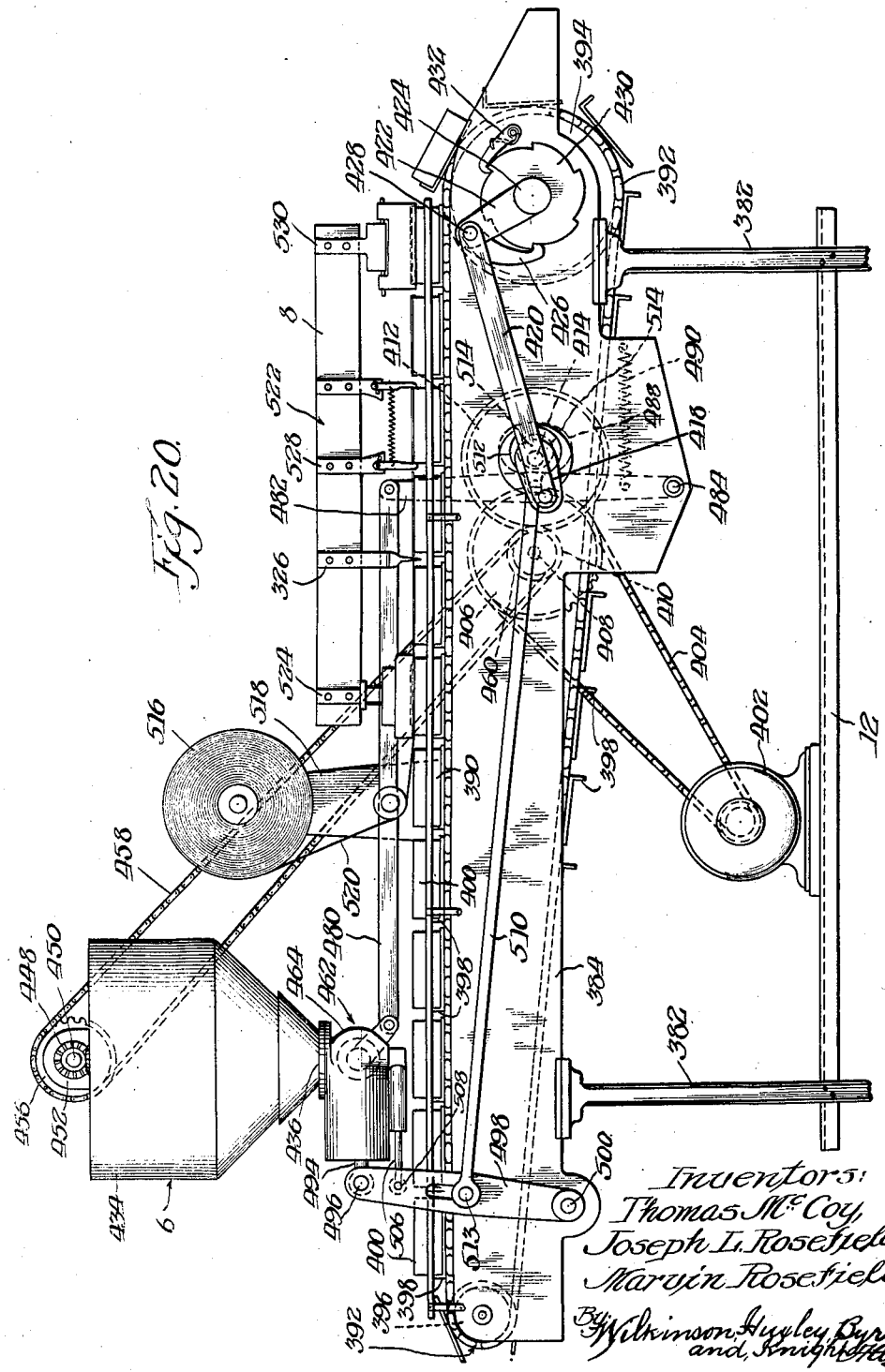

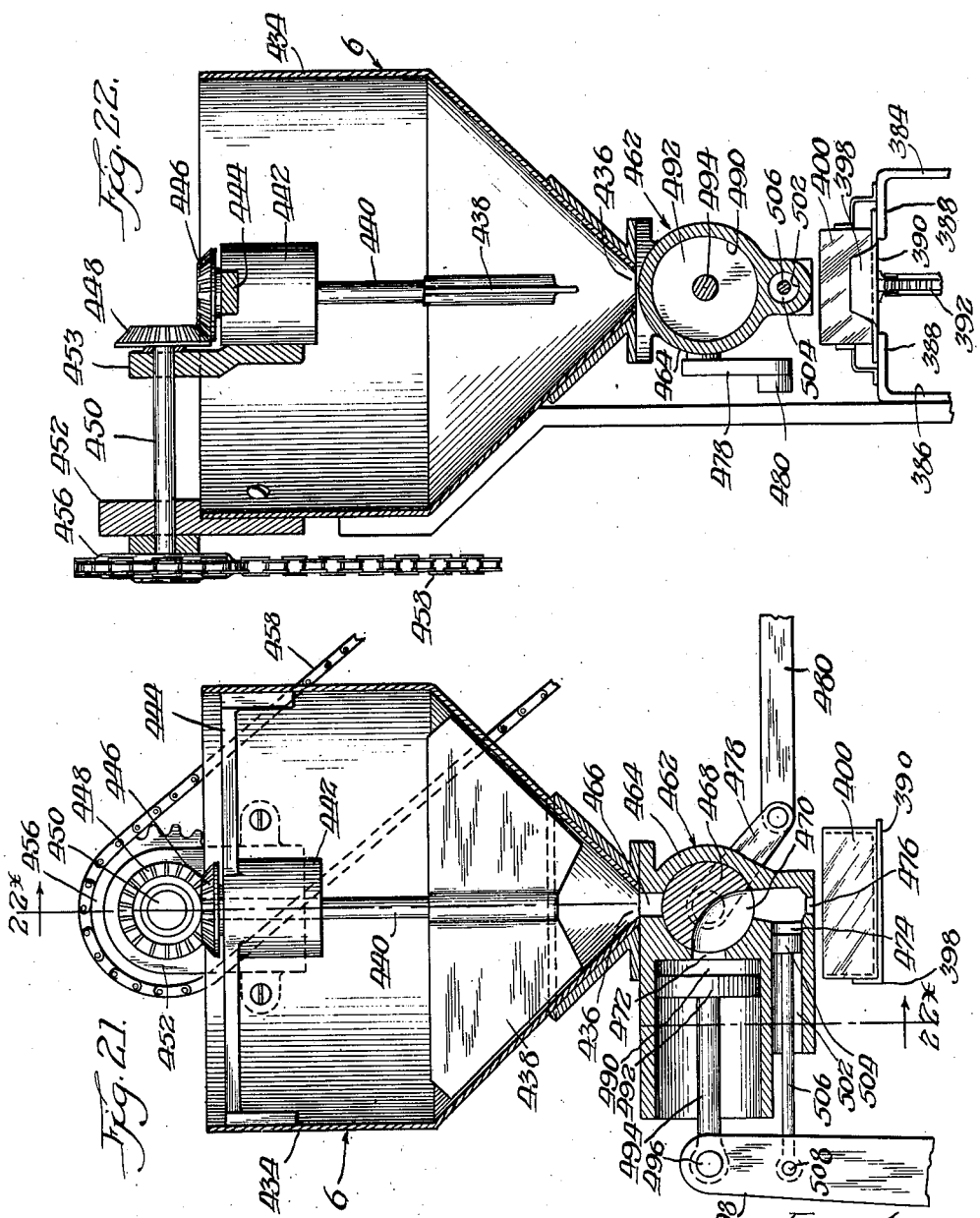

Patented Sept. 17, 1940

2,215,011

UNITED STATES PATENT OFFICE 2,215,011

MACHINE FOR MAKING, FILLING, AND SEALING PACKAGES

Thomas McCoy, Oakland, and Joseph L. Rosefield and Marvin Rosefield, Alameda, Calif.; said McCoy and said Marvin Rosefield assignors to said Joseph L. Rosefield Application March 9, 1938, Serial No. 194,780

30 Claims. (Cl. 93—43)

This invention relates to apparatus for performing the operations of continuously constructing merchandise containers consisting of collar-like frame members and membranous heads or walls extending across the two spaced openings defined by such frame members, and hermetically united to the latter whereby the said heads are maintained in distended position and the closure of the container is rendered complete; also to means whereby the container may receive the commodity that is to be shipped therein after the application of one membranous head or wall, and this filling of the container can then be followed by the application of the other membranous head or wall.

The invention further relates to a means whereby the frame of the receptacle may be hermetically enveloped in an impervious jacketing material and assumes such relation to the latter that it will serve as a means of hermetically uniting the membranous heads to the frame, as for instance, by forming the envelop and membranous heads of material that unites under fusion or solution.

The invention further relates to means for manipulating the materials from which the receptacles are constructed and whereby they are presented in proper position and sustention to cooperating mechanisms which perform the several steps in the work.

In the accompanying drawings, which illustrate the preferred embodiment of the several features of the invention:

Figure 1 is a side elevation of a complete machine as far as the step of discharging receptacles with one distended wall hermetically united thereto and leaving each receptacle in position to receive the contents for which it is intended.

Figures 2 and 3 are, respectively, a plan view and a side elevation, both on an enlarged scale, of that portion of the machine designed by the character A in Figure 1.

Figure 4 is a section on the line $4x$—$4x$ of Figure 2.

Figure 5 is a section on the line $5x$—$5x$ of Figure 3, of the sealing rolls by which the hermetic jacket is applied to the framing material.

Figure 6 is a section on the line $6x$—$6x$ of Figure 4.

Figure 7 is a side elevation, on substantially the same scale as Figures 2 to 6 inclusive, showing that portion of the machine designated by the character B in Figure 1, and to which partially closed, hermetically enveloped, collar-like frame members are delivered from the portion A of the machine.

Figure 8 is a plan view of parts shown in Figure 7.

Figures 9 and 10 are horizontal views, on a smaller scale, of folding mechanism that completes the closure of the collar in the forming of the frame, the positions of the folding fingers being in progressively different positions.

Figure 11 is a vertical longitudinal section on the line $11x$—$11x$ of Figure 12 of that portion of the machine designated by B.

Figure 12 is a rear elevation of that portion of the machine represented by the character B, as seen from the right-hand end of Figure 11 or the left-hand end of Figure 7, the scale being about the same as that of Figure 11.

Figure 13 is a detail view in side elevation of parts presented in the plane $13x$—$13x$ at the left of Figure 12, and which may be at the remote side of Figure 8.

Figure 14 is an elevational view, on an enlarged scale, of those portions of the machine designated by the characters C, D, E and F in Figure 1.

Figure 15 is an elevational view of the opposite side of that portion of the machine shown in Figure 14, minus the roll of membranous material.

Figure 16 is a section on the line $16x$—$16x$, as seen from the right of Figure 15.

Figure 17 is an end elevation of the portion of the machine indicated at F in Figures 1, 14 and 15.

Figure 17a is a top plan view of the box frame assembly.

Figure 17b is a view in perspective of a box or container made in accordance with the present invention.

Figure 18 is a plan view of the overhead portions C, D, E and F of the machine, as seen in Figures 1, 14, 15 and 17.

Figure 19 is a plan view of means for charging the complete open receptacle with the commodity that is to be shipped and for applying thereto a hermetic closure similar in principle to the bottom closure applied in the portions C, D and E after the goods are in place, said means including the machine sections designated at G, H, I and K.

Figure 20 is a side elevation of mechanism shown in Figure 19.

Figure 21 is a transverse axial section of the feed hopper and valves of Figure 20; and Figure 22 is a section on the line $22x$—$22x$ of Figure 21.

The present invention is directed to suitable mechanism for forming merchandise containers comprising collar-like frame members and membranous members or walls extending across the two spaced openings defined by such frame members and hermetically united to form closure members therefor for containing some commodity, such as peanut butter or the like. The present invention comprehends the idea of providing a novel machine continuously operable for the formation of these boxes and novel means whereby the boxes are charged with unit quantities of material and the boxes suitably closed to protect said commodity.

In the illustrative embodiment of the invention, the machine comprises generally a box material feeding assembly 2, a box forming assembly 4, a box sealing means 5, a commodity feeding assembly 6, and a box sealing and discharge means 8. The invention comprehends a box material feeding assembly 2 wherein certain components of the box structure are successively fed from a receptacle and assembled, and said certain assembled parts of the box progressively moved to the box forming device 4. The machine as a whole comprises a frame 10 for the box material feeding assembly 2 and box forming assembly 4 and sealing means 5, and a frame 12 upon which the material feeding means 6 and the box sealing and discharge means 8 are mounted. For a general illustration of this device, reference is hereby made to Figures 1 and 20 of the drawings, the device as shown in Figure 1 being disposed preferably in alignment with the machine shown in Figure 20. This facilitates the operation of forming and filling a box in accordance with the present disclosure, and the machine can be properly supervised when this assembly is adhered to to see that the proper functions are being performed thereby.

Referring more particularly to Figures 1 to 6 inclusive, the box material supply assembly 2 is shown as being supported upon uprights, such as 14, at the extreme left of the base 10, said material supply assembly being formed with spaced wall members 16 and 18 between which is disposed a supporting plate 20. Secured to this plate as by means of bolts 22 is a hopper 24 formed with the front wall as clearly shown in Figure 6 of the drawings, with a space 26, this space permitting horizontal movement successively of elongated strips of material 28 which are preferably formed of fibrous material, such as cardboard or the like. Movement of successive elongated strips of cardboard 28 to the right as shown in Figure 4 is effected by means of an intermittently movable plate 30 which operates between and is guided by the plate 20 and the hopper 24. This plate 30 extends between the side walls 16 and 18 of the device and is mounted upon a cross arm or yoke 32 which is guided in oppositely disposed slots 34 of the walls 16 and 18. The cross arm 32 of this feed mechanism is connected exteriorly of the walls 16 and 18 to the pitmans 36 and 38. Pitman 38 is eccentrically connected to gear 42 while pitman 36 is eccentrically connected to a disk 40 and both said gear and disk are mounted on shaft 41 to which reference will be made hereinafter. Said pitmans are operated by said shaft whereby the plate 30 is intermittently reciprocated for progressively and successively feeding the elongated cardboard strips 28 to the right, as shown in Figure 4 of the drawings.

These pitmans 36 and 38 may be driven by means of a prime mover, such as a motor or the like, through a belt 44, as shown in Figure 3 of the drawings, which belt passes over a pulley 46 mounted upon a shaft 48 which is journaled in the side walls 16 and 18, and which, adjacent one end thereof exteriorly of the wall 18, has mounted thereon the segmental gear 50 which is adapted to mesh with the gear 42. Other driving arrangements may be provided, for example, as shown in Figure 1 of the drawings, wherein the sprocket chain 52 is shown as passing over a sprocket 54 which may be mounted on the end of shaft 48, this sprocket chain 52 being driven from a sprocket 56 of the box forming assembly 4, as will be hereinafter more particularly referred to. This is the preferred drive for the box material feeding assembly 2 although, as pointed out hereinbefore, said assembly may be driven by said belt 44.

Referring now to Figure 17a, which discloses a frame member of the box to be formed as shown in Figure 17b, it will be noted that the cardboard strip 28 is enclosed by an envelope of membranous material 58 which may include opposite strips of material hermetically sealed as by the application of heat or solutions along the marginal edges thereof, as at 60 and 62, it being understood that these strips extend as at 64 and 66 beyond the ends of the strip of cardboard 28.

The box material supplying means also includes means for forming the assembly of Figure 17a, which is a component part of the completed box. Such means includes the two supply rolls 68 and 70 of some suitable membranous material which may be formed from cellulose or the like, and which is preferably transparent or semi-transparent in character. The roll 68 extends in the form of a web 72 which passes over a roll 74 mounted upon shaft 41 which is journaled in the walls 16 and 18, while roll 70 extends in the form of a web 78 which passes around a roll 76. Roll 76 is mounted upon a shaft 71 journaled in bearings 73 and 75 and is driven by means of a gear 77 mounted upon shaft 71 which meshes with a similar gear mounted on shaft 41. Roll 76 is urged into frictional engagement with the web 78 by means of coil springs 80 disposed between the ledges 84 of the sides 16 and 18 and abutting the bearing members 73 and 75 in the same way as the roll shown in Figure 5 of the drawings, which structure will be hereinafter more fully described. It will be noted that, as shown in Figure 4 of the drawings, successive strips of cardboard progressively pass to the right between rolls 74 and 76 and that webs 72 and 78 are disposed adjacent the lower and upper surfaces of these elongated strips of cardboard as the same are fed between said rolls. As the elongated cardboard members with the webs of material 72 and 78 disposed adjacent the lower and upper surfaces thereof pass through rolls 74 and 76, the same are engaged between upper and lower rolls 86 and 88, roll 86 being mounted on a shaft 89 journaled in the walls 16 and 18 and being positively driven by means of the gear 90 mounted thereon which meshes with gear 42. The roll 88 is mounted upon a shaft 91 journaled in bearings corresponding to bearing members 73 and is driven through a gear mounted on shaft 91 which meshes with a similar gear mounted on shaft 89. The roll 88 is urged into cooperative relation with the surface of web 72 by means of the coil springs 92 disposed between bearings 73 and projections 93 extending from the walls 16 and 18.

As the assembled collar-like frame of the box passes through rolls 86 and 88, the webs 72 and 78 of membranous material are severed by cutters or knives 96 and 98 which have cooperating cutting edges and each of which is heated as by means of resistances 100 suitably housed within the housing 102 attached to the side of each of the blades of these cutting elements, such heating serving to seal the free ends of these webs between the collar-like assembly between rolls 86 and 88 and the collar-like assembly between rolls 76 and 78.

This cutting and sealing operation involving relative movement of the knife elements 96 and 98 is effected by means of shaft 48 of this assembly. For example, the knife 98 is formed with an elongated lower enlarged web section 104 provided with an abutment adjacent the lower edge thereof which is engaged by one of more cams 106 mounted on the shaft 48, these cam members 106 lifting the knife element 98 upwardly to sever the webs 72 and 78 and by application of heat to seal the free ends thereof as above described. In order to maintain intimate engagement between the lower abutment 104 and the cam elements 106, one or more coil springs 108 are provided, the same being secured to the plates 16 and 18 at one end thereof as at 110, and the other end of which is secured to projections such as 112 extending from the abutment 104.

The knife element 96 is provided with a cross arm 114 which extends entirely across this assembly and is guided in vertical slots 116 and 118 formed in the wall members 16 and 18, respectively, and to the ends of which are pivotally secured pitmans 120 and 122, respectively, each of which has a lower eye, such as 124, embracing cams or eccentrics such as 126, mounted upon the shaft 48 whereby cutting element 96 is reciprocated intermittently downwardly to cooperate with cutting element 98, as hereinbefore described.

After the portions of webs 72 and 78 have been sealed along both the longitudinal edges to envelope the fibrous inner core, the same passes between upper and lower rolls 128 and 130, the lower roll 130 is mounted on shaft 131 suitably journaled in walls 16 and 18 and is positively driven by means of gear 132 mounted exteriorly of wall 18 on said shaft 131 and meshing with the gear 90. This roll is provided with a gear 134 adapted to mesh with a gear 136 mounted on the shaft 138 for roll 128, whereby said roll 128 is driven in accordance with the movement of roll 130. Shaft 138 is provided at its ends with bearing blocks 140 and 142 engaged, respectively, by coil springs 144 and 146, which springs are disposed between said blocks and ledges 148 and 150 projecting inwardly from walls 16 and 18, whereby said springs act upon the roller shaft 138 to maintain constant engagement of the rolling surface of said roll 128 with parts 64 and 66 of the membranous material 72 and 78 at the ends of the elongated strip 28, the engagement of such portions 64 and 66 being effected by means of enlarged circular collar portions 152 and 154 formed as an integral part of roll 128, which portions may be suitably heated whereby the engagement thereof with portions 64 and 66 effects a sealing of the two web or membranous materials at the ends of strip 28.

It should be noted in passing that the rolls as hereinbefore described are suitably spaced apart so that the feed of the assembled cardboard strip and membranous webs or material is progressive through this part of the machine.

After the box frame assembly is perfected in the manner above described, the same is discharged from rolls 128 and 130 onto a table 156 which extends from the machine assembly 2 to a point adjacent machine assembly 4. The box frame assemblies are progressively fed along table 156 by means of a chain conveyor 158 which consists of oppositely disposed chains 160 and 162, which chains, as clearly shown in Figures 1, 7 and 8, pass over sprockets 164 and 166, respectively, mounted adjacent the right-hand end of table 156 adjacent the machine assembly 4. The other ends of these continuous chains pass over sprockets similar to sprockets 164 and 166 suitably mounted between walls 16 and 18 and having a gear associated therewith which is operated by the drive sprocket 54 in any desired manner for operating these chains for conveying the box frame assemblies to the machine assembly 4. Each of the chains 160 and 162 is formed with spaced lugs, such as 168, adapted to engage the box frame assemblies adjacent the ends thereof, these lugs being operable within and guided by suitable slots formed in the top surface of the table 156.

As will be clearly appreciated from the foregoing, the box frame assembly is fabricated in the manner described in order to facilitate operations. In order that the same may be of use in the construction of a container, it is necessary to fold the same to form the box frame. Assembly 4 functions to perform this operation and, in addition thereto, applies a membranous sheet or web to said box frame which extends across one of the openings thereof to provide a partially completed receptacle for receiving some commodity.

The frame forming device 4 consists generally of conveyor mechanism 170 supported by the standards 172 on the base or frame 10 and with which conveyor mechanism 170 is associated material feeding means 174 and mechanism 176, both of which will be referred to more in detail hereinafter. Referring more in detail to the conveyor mechanism, the standards 172 are connected at their upper ends to plates 178 and 180 adjacent the upper ends of which are the inwardly projecting platforms 182 and 184 secured thereto, which platforms are provided with the angle irons 186 and 188, respectively, which serve as guides for the flexible conveyor unit generally referred to as 190. The flexible conveyor unit 190 comprises a sprocket chain 192 passing around a sprocket 194 at one end of the system, which sprocket is mounted upon the shaft 196 suitably journaled in the walls 178 and 180. The other end of the sprocket chain 192 passes around the sprocket 198 mounted upon a shaft 200 which is suitably mounted in the walls 178 and 180 at the other end of the conveyor system.

Motive power for the conveyor is supplied by means of an electric motor 202 which drives the sprocket chain 204, which in turn passes around sprocket 206 mounted on shaft 208 which is journaled in the walls 178 and 180 and which has gear 210 mounted thereon meshing with gear 212, said gear 212 in turn being mounted upon shaft 214 journaled in the walls 178 and 180 and which extends outwardly therefrom. The extension of shaft 214 from plate 180 is provided with a crank 216 to which is connected pitman 218 extending to the right, as shown in Figure 14 of the drawings, and which is connected to lever 220 rotatably mounted upon shaft 200 and which carries a pawl 222 engaging the ratchet wheel 224 fixedly mounted on the shaft 200, whereby sprocket 198 is intermittently rotated for intermittently moving the conveyor chain 192 for progressively moving elements to be referred to. In connection with the pawl and ratchet mechanism 222 and 224, it should be noted that a second pawl 226, spring-pressed as by means of spring 228, is provided to assure proper performance of the intermittently moving conveyor system.

The conveyor chain 192 is provided with a plurality of spaced box forming elements 230 suitably connected thereto, and which elements, upon movement of the conveyor system to the left as shown by the arrow in Figure 1 of the drawings, are successively presented adjacent the right-hand end of table 156, the disposition of these forming elements 230 being timed in accordance with the movement of the box frame assembly so that these box forming elements are disposed in the position shown in Figures 1, 7, 11 and 12 of the drawings for receiving the box frame assemblies. By more specific reference to Figure 12 of the drawings, it will be noted that these box forming elements comprise a backing sheet 232 provided with oppositely disposed ribs or webs 234 and 236 which are somewhat shorter than the length of the sheet 232, and accordingly said sheet beyond the ends of the webs 234 and 236 forms abutments. The box frame assembly is presented upon discharge from the table 156 to the box forming element 230 disposed in receiving position so that the box frame assembly rests upon the upper ends of webs 234 and 236 and in abutting relation with the plate 232. In this position the box frame assembly is moved with the box forming element upwardly in accordance with the rotation of the conveyor to a point where said box frame assembly is engaged by oppositely disposed cheek plates 238 and 240, the box frame assembly being guided during this movement by guide strip 241 which has one end thereof connected to cross bar 243 and the other end to shaft 280 later referred to. These cheek plates effect a bending of the box frame assembly about the webs 234 and 236 so that the same is in the position as shown in Figure 8 of the drawings, with free ends 242 and 244 extending beyond the rearward ends of webs 234 and 236.

Suitable mechanism is provided for bending the free ends 242 and 244 and for sealing the same. Such mechanism includes the drive sprocket 56 which is mounted upon the shaft 246, which shaft, in turn, is suitably mounted in the walls 178 and 180, as clearly shown in Figure 12 of the drawings, and which shaft is also provided with a sprocket 248 on the opposite side of the machine which is engaged by sprocket chain 250, this sprocket chain 250 passing around and being driven by sprocket 252 mounted upon the shaft 214 whereby motive power is provided for operating the shaft 246 as well as the box material supplying means 2 through sprocket 56, as hereinbefore described.

Mounted upon the shaft 246 is a cam member 254 having oppositely disposed cam surfaces 256 and 258 and adjacent which are arms 260 and 262 pivoted upon the common axis 264, the arm 260 being provided with a roller 266 at one end thereof cooperating with the cam surface 258, and at the other end of which is a finger 268 extending inwardly therefrom and which is adapted to engage the free end 242 of the box frame assembly. The cam surface 258 is suitably formed so that when the box forming element with the associated box frame assembly reaches a certain position, the finger 268 engages the free end 242 and moves the same inwardly around the end of web 236, as clearly shown in Figure 9 of the drawings.

Mounted in spaced relation to the cam member 254 and also on the shaft 246 is another cam member 270 having a cam surface 272 adapted to cooperate with a roller 274 mounted on the lever arm 276 which is pivoted as at 277. This arm 276 has at the opposite end thereof an inwardly disposed finger 278 adapted to engage the free end 244 of the box frame assembly when the forming element upon which the same is mounted has reached a certain position. This engagement of finger 278 with end 244 is properly timed with respect to the engagement of finger 268 with free end 242 so that end 244 is moved by the finger 278 into overlapping relation with end 242. As this overlapping is accomplished, means for sealing the two ends together is provided.

Such means comprises a shaft 280 suitably mounted in side bearings such as 282 and 284 and on which shaft is mounted a projecting sealing member 286. This shaft 280 is rotated for moving sealing member 286 into the position as shown in Figure 10 of the drawings, as by means of a crank 288 mounted adjacent one end of said shaft, and which crank is in turn operated by means of a lever arm 290 pivoted as at 292, the other end of the lever arm 290 being provided with a roller 294 adapted to cooperate with and follow the cam surface 296 of a cam member 298 mounted on the shaft 246 adjacent the cam member 270. The cam surface 296 is so constructed that the sealing member 286 is moved downwardly by the shaft 280 at the proper time into the position as shown in Figure 10 of the drawings, such sealing member 286 being heated in any desired manner to effect hermetic sealing of the two ends 244 and 242 at that point, it being noted that at the time sealing member 286 is in the sealing position that the finger 278 is in engagement with end 244, which serves to hold the two ends in associated relation during the sealing operation.

Concurrently with the sealing of ends 244 and 242 as by means of the cooperative relation between finger 278 and sealing member 286, arm 262 is operated for sealing the extreme end 244 and that part of the box frame assembly adjacent thereto. It will be noted that arm 262 is provided with roller 300 cooperating with the cam surface 256 whereby said arm is pivoted about the axis 264. The arm 262 is provided with a sealing element 302 at its other end which is adapted to be moved into association with the extreme end portion of end 244 whereby the same is moved by said sealing member into intimate association with the adjacent part of the box frame assembly. This sealing member is also heated to effect the sealing in the manner disclosed.

It is clearly understood, of course, that the elements herein referred to are so constructed, arranged and operated in the proper sequence as to effect the results described.

As will be clearly appreciated, after each of the box forming elements 230 passes beyond the immediate vicinity of shaft 246, the elongated strips forming the box frame assemblies are folded to form collar-like frame members constituting the sides of the boxes which are made in accordance with the present invention. These box frame assemblies are intermittently and successively moved by the conveyor mechanism 190 to a position whereby further operations are performed thereon to connect a membranous member thereto to close one of the spaced openings of each of them, the membranous member being preferably of some material such as cellulosic material responsive to heat solutions or the like to seal the same, the membranous material enveloping the fibrous strip 28.

This step in the assembly of the boxes is effected by means of mechanism more particularly disclosed in Figures 14 to 18 inclusive of the drawings, and the same is generally referred to as 176, which mechanism comprises sealing means 306, cutting means 308, sealing means 310 and sealing means 312. Such means 306, 308, 310 and 312 are all mounted upon a cross head 314 mounted upon a vertical supporting slide 316, which slide is guided by members 318 and 320 suitably supported on the wall 178 through the medium of a roll 322 mounted upon the stub shaft 324 which is fixed to the plate 316. As shown in Figure 16 of the drawings, the cross head 314 is reciprocated in a vertical plane by means of a cam 326 engaging with roller 322 and which cam is mounted upon the shaft 214. Upon rotation of shaft 214, the vertical plate 316 is reciprocated in a vertical plane, it being understood that said plate 316 embraces shaft 214 by way of a slot 328 which permits such reciprocation. In order to provide for intimate association between roller 322 and cam 326, springs 330 and 332 are provided, the upper ends thereof being secured to the vertical plate as at 334 and the other ends of which are secured to a cross bar 336 extending between guide members 318 and 320.

Mounted at one end of the cross head 314 is the material supply roll 174, as hereinbefore referred to, which roll is suitably mounted on one or more standards 338 and the web 340 of which is fed downwardly about roll 342 into a position immediately adjacent and above the upper surface of the box frame assemblies as the same are moved by the conveyor. This web 342, which is preferably of cellulosic material, either transparent or semitransparent, is unwound or fed from the roll 174 because of its attachment to certain of the box frame assemblies and such feeding is accomplished through movement of the conveyor system 190. As shown in Figure 14 of the drawings, a plurality of box forming elements are disposed in association with the cross head 314 and are being successively operated on by means 306, 308, 310 and 312 for performing certain definite operations. The box forming element identified as 344 in said figure is disposed directly beneath means 306, which means comprises a heating plate 346 resiliently mounted to the bracket 348, said plate 346, upon downward movement of the cross head 314, engaging that portion of the web 340 immediately above the box frame assembly disposed on the box forming element 344 whereby, by the application of heat, a certain portion of this web is hermetically sealed to the membranous web materials enveloping or embracing the cardboard frame of the box frame assembly.

Upon intermittent movement of the conveyor system, said box frame assembly 344 successively moves to the right, and upon downward movement of the cross head 314 the same is successively operated on by means 308, 310 and 312. Means 308 comprises a cutting element 350 suitably connected to a bracket 352 whereby the web is severed between two adjacent box frame assemblies. Means 310 comprises spaced heating elements 354 and 356 pivotally mounted to brackets 358 and 360, respectively, and being connected by means of one or more coil springs 362, such elements 354 and 356 being heated to further seal the web ends of the membranous material to the box frame assembly. After the end sealing operation has been performed, the box frame assembly moves to be operated on by means 312, which comprises spaced heating elements 364 and 366 pivotally mounted to spaced brackets, such as 368, which sealing elements 364 are suitably heated and are connected together by springs such as 362, for engagement with the sides of the web of membranous material secured to the box frame assembly to seal said longitudinal edges thereof. It is to be observed that means 310 and 312 are of similar construction except that one is turned ninety degrees to the other.

After a portion of web 340 is secured to each of the box frame assemblies, said assemblies then include a closure for one of the open ends thereof, such closure, for example, being designated in Figure 17b as 370. At this stage in the assembling of the boxes, the same are removed from the conveyor mechanism 190 by means of one or more rubber discs 372 and 374 mounted upon the armature shaft of motors 376 and 378, respectively, which motors are secured to the walls of the conveyor mechanism as by means of straps 380. These rubber discs engage the sides of the box frame assemblies to remove them from the box forming elements whereby the same are discharged into a hopper or from the conveyor at a point convenient for the next successive step in the operation of the machine herein described.

As hereinbefore referred to, Figure 20 discloses an assembly comprising material feeding means 6 and additional sealing means 8, such means being mounted upon the base 12 by means of standards such as 382. This device includes the oppositely disposed frame members 384 and 386 providing a support for a conveyor 390, said frame members being spaced apart to provide runway or track 388 for said conveyor. The conveyor 390 comprises sprocket chain 392 passing around sprocket wheel 394 at the right-hand end of the device and sprocket wheel 396 at the left-hand end of the device. This sprocket has mounted thereon spaced supports or abutments 398 for receiving a plurality of the box frame assemblies 400 which have been discharged from the end of the assembly shown in Figure 14 of the drawings. An operator successively places such box assemblies on the supports 398 with the open end of the assemblies facing upwardly whereby material may be discharged into the same from the material supplying device 6.

The conveyor is driven by means of a motor 402 through a sprocket chain 404 which passes about a sprocket 406 mounted on a shaft 408, this shaft, in turn, being mounted in the frame members 384 and 386. This shaft 408 has a gear 410 mounted thereon meshing with gear 412, which latter gear is mounted upon shaft 414 which in turn is suitably mounted in the frame members 384 and 386. Shaft 414 extends outwardly from the front of frame member 384 and has mounted thereon a crank 418 connected to the pitman 420, the other end of which is connected to lever 422 rotatably mounted upon shaft 424 which serves as a mounting for sprocket 394. Pawl 426 is mounted on the pivot 428 connecting the lever 422 to the pitman 420 and the same cooperates with ratchet 430 for rotating shaft 424 and the sprocket 394. Spring-pressed pawl 432 is also provided for engagement with ratchet 430 to assure proper operation of the conveyor system. The drive above described intermittently moves the conveyor and successively moves the box frame assemblies to a position as shown in Figure 21 of the drawings, immediately below the material feeding means 6.

The feeding means which has been disclosed herein is particularly adapted for feeding peanut butter which, as will be clearly appreciated, is of a viscous, gooey character needing agitation to maintain constant consistency and requiring suitable mechanism to properly feed the same. The material feeding means comprises the hopper 434, the upper part being substantially cylindrical in shape and the lower part being of cone formation with the outlet 436. Disposed in the cone shaped part is an agitator 438 of blade formation mounted on a vertically disposed shaft 440, the upper part of which is mounted in bearing 442 of a spider 444 extending across the opening of the cylindrical part and being secured to the side walls thereof. At the upper part of the shaft 440 is a beveled gear 446 meshing with a beveled gear 448 mounted adjacent the end of a horizontally disposed shaft 450 extending laterally and beyond the periphery of the cylindrical part of hopper 434 and being suitably journaled adjacent its inner and outer ends as at 452 and 453. Mounted on the outer end of shaft 450 is a sprocket 456 about which passes a sprocket chain 458, which sprocket chain extends downwardly and passes around a sprocket 460 mounted on the end of shaft 408 whereby the agitator 438 is rotated intermittently in accordance with the drive of the conveyor, this agitator serving to maintain a uniform and constant consistency of the peanut butter disposed in the hopper in order that each of the units discharged therefrom will be of uniform mix and substantially of equal weight.

Mounted immediately adjacent the opening 436 is a valve assembly 462 comprising the valve housing 464 with the inlet 466 in substantial registry with the opening 436. The valve member 468 seats within a suitable opening in the valve housing and is mounted for rotation therein. This valve is provided with a valve passage 470 adapted to communicate with opening 466, with opening 472, opening 474 and the discharge opening 476 all provided in said housing 464. This valve member 468 is rotated by means of lever 478 connected to link 480 which is intermittently moved through lever 482 connected to said link at one end and pivotally connected to the frame as at 484 at its other end. Intermediate the ends of said lever 482 the same is provided with means 486 cooperating with a cam 488 driven by shaft 414, the engagement between said lever and said cam being effected by means of a coil spring 490 connected to the lever at one end and to the frame at the other, as clearly shown in Figure 20 of the drawings.

The opening 472 communicates with the cylinder 490 formed in the housing 460, in which cylinder is the piston 492 connected to the piston rod 494, and which rod is connected by means of a pivot 496 to the upper end of lever 498, which lever, at its lower end, is pivotally connected as at 500 to the frame of the machine, as clearly shown in Figure 20. Opening 474 communicates with cylinder 502 formed as a part of housing 464 and in which is disposed the piston 504 connected to the piston rod 506, which rod, at its outer end, is pivotally connected as at 508 with lever 498. Lever 498 is oscillated by means of a link or rod 510 which has its other end formed in the shape of an eye 512 embracing a cam 514 mounted on the shaft 414, the cooperation between said eye 512 and cam 514 effecting movement of lever 498 and through said lever the pistons 492 and 504, it being noted that certain lost motion is provided by the pin and slot connection 513 between rod 510 and lever 498.

The operation and advantages of such construction can be clearly appreciated when the viscosity or nature of peanut butter is considered, and the operation of discharging a unit quantity of such peanut butter into the box frame assembly disposed immediately below the opening 476 is as follows: Upon movement of lever 480 to the left, as shown in Figures 20 and 21, the valve 468 is rotated into a position whereby opening 470 communicates with openings 466 and 472. When the valve 468 is in this position, operation of the piston 492 to the left in the cylinder 490 is effected by lever 498, whereby the piston sucks a unit quantity or gob of peanut butter from hopper 434. After this unit quantity has been sucked out of the hopper, the valve 468 is rotated in a counterclockwise direction by movement of lever 480 to the right whereby opening 470 now communicates with opening 472 and openings 474 and 476. The operation of lever 498 is such that when the valve is in this position, reverse movement of the piston head 492 takes place whereby the unit gob or quantity of peanut butter is discharged through opening 476 into the box disposed immediately below the same. Piston 504 operates as an anti-drip mechanism to prevent dripping of peanut butter or the like through opening 476 during movement of a filled box away from the immediate vicinity of the valve and before an empty box has been moved into a position to be filled.

The filled boxes are then conveyed progressively toward the right of the machine, as shown in Figure 20 of the drawings, to receive a membranous sheet of material of the character described for closing the top opening of the box frame assemblies. The means for supplying these membranous pieces of material thereto comprises a roll 516 mounted upon the pedestal 518 and which supplies a web 520 of the membranous material to form the top closure member of these box frame assemblies. This web 520 is fed in exactly the same manner as web 340 disclosed in Figure 14 of the drawings and hereinbefore referred to, and the same is operated upon successively by means of the cross head 522 which includes means 524, 526, 528 and 530 corresponding in all respects to means 306, 308, 310 and 312, respectively, whereby the top openings of these box assemblies are closed by end closure members 531 as shown in Figure 17b of the drawings. In view of the previous description of these corresponding elements, it is assumed that the operation of the final closing of the boxes will be clearly understood, and it will be clearly appreciated that as the boxes are discharged from the conveyor means 390 of Figure 20, that the peanut butter, or any other commodity being packaged, will be completely and hermetically sealed. The boxes, after being operated upon by means 530 which performs the final sealing operation, are discharged from the conveyor 390 at the end of the machine into a hopper or onto a suitable table whereby the same may be packed and shipped.

Although specific reference has been made in the above description to the use of heating means for effecting certain sealing operations, nevertheless the present invention contemplates the idea of using such means, or any other suitable means, such as application of solution or the like, for effecting the same results. It is furthermore to be understood that the material supply means 6, as illustrated in Figure 20, is particularly adapted for dispensing goods of the character of peanut butter, but the present invention contemplates the use of any material discharge means which is adapted for dispensing unit quantities of any given materials in combination with other units of this present assembly.

While we have herein described and upon the drawings shown illustrative embodiments of the invention, it is to be understood that the invention is not limited thereto but may comprehend other constructions, arrangements of parts, details and features without departing from the spirit of the invention.

We claim:

1. In a machine for constructing merchandise containers, the combination of means for feeding a piece of material forming the frame of said containers, means for bringing into juxtaposition with said frame member adjacently disposed membranous layers of material, and means for securing said layers together along the marginal edges thereof exteriorly of said frame to envelop the same.

2. In a machine for constructing merchandise containers, the combination of means for feeding a piece of material forming the frame of said containers, means for bringing into juxtaposition with said frame member adjacently disposed membranous layers of material inherently possessing the property of adhering together upon treatment by a sealing instrumentality, and means for treating the adjacently disposed marginal edges of said membranous material to seal the same whereby said frame member is enveloped by the same.

3. In a machine for constructing merchandise containers the combination of means for supplying an elongated piece of material forming the frame of said containers, means for bringing into juxtaposition with opposite sides of said frame member adjacently disposed membranous layers of material inherently possessing the property of adhering together upon treatment by a sealing instrumentality, means for treating the adjacently disposed longitudinal edges of said membranous material to seal the same, and means for treating adjacently disposed ends of said membranous material to seal the same, whereby the said frame member is enveloped by said membranous material.

4. In a machine for constructing merchandise containers, the combination of means for successively supplying pieces of material forming the frame of said containers, means for supplying and positioning webs of membranous material in juxtaposition with the upper and lower surfaces of said frame member, and means for cutting said webs along opposite edges of said frame member and simultaneously sealing said adjacently disposed edges of said webs to envelop said frame member.

5. In a machine for constructing merchandise containers, the combination of means for successively supplying pieces of material forming the frame of said containers, means for supplying and positioning webs of membranous material inherently possessing the property of being sealed together by application of heat in juxtaposition with the upper and lower surfaces of said frame member, means for simultaneously cutting and sealing said webs by application of heat along marginal edges of said frame member and to envelop said frame member, and means for sealing the adjacently disposed ends of said membranous members by the application of heat.

6. In a machine for constructing merchandise containers, the combination of means for successively supplying pieces of material forming the frame of said containers, means for supplying webs of membranous material to be disposed in juxtaposition with the upper and lower surfaces of said frame member, conveyor means cooperating with said webs and frame members for progressively moving the same, and means for severing the adjacently disposed webs on both sides of said frame members and for simultaneously sealing the adjacently disposed edges of said webs.

7. In a machine for constructing merchandise containers, the combination of means for successively supplying pieces of material forming the frame of said containers, means for supplying webs of membranous material to be disposed in juxtaposition with the upper and lower surfaces of said frame member, conveyor means cooperating with said webs and frame members for progressively moving the same, means for severing the adjacently disposed webs on both sides of said frame members and for simultaneously sealing the adjacently disposed edges of said webs, and means for sealing the adjacently disposed ends of said membranous material.

8. In a machine for constructing merchandise containers, the combination of means for successively supplying pieces of material forming the frame of said containers, means for supplying webs of membranous material to be disposed in juxtaposition with the upper and lower surfaces of said frame member, conveyor means cooperating with said webs and frame members for progressively moving the same, said conveyor means comprising a plurality of cooperating rolls spaced apart less than the width of said frame members, means disposed between certain of said rolls for severing and sealing the adjacent edges of said membranous material and certain other of said rolls having means for sealing the adjacent ends of said membranous material.

9. In a machine for constructing merchandise containers, the combination of forming means adapted to receive a frame member having a covering of membranous material, separately operated members engaging the free ends of said frame member and movable in predetermined sequence for overlapping the free ends of said frame members in conformity with said forming means, and means for sealing the adjacently disposed membranous material of said overlapped ends.

10. In a machine for constructing merchandise containers, the combination of forming means adapted to receive a frame member having a covering of membranous material, separately operated members engaging the free ends of said frame member and movable in predetermined sequence for overlapping the free ends of said frame members in conformity with said forming means, and means for sealing the adjacently disposed membranous material of said overlapped ends at a plurality of places.

11. In a machine for constructing merchandise containers, the combination of forming means adapted to receive a frame member having a covering of membranous material, means cooperating with said forming means for bending said frame member to provide adjacent corners of a substantially rectangular container, separately operated members engaging the free ends of said frame member and movable in predetermined sequence for bending the free ends of said frame member to provide opposite adjacent corners of said substantially rectangular container and to dispose said free ends in overlapping relation in conformity with said forming means, and means for sealing the adjacently disposed membranous material for said overlapped ends.

12. In a machine for constructing merchandise containers, the combination of forming means adapted to receive a frame member enveloped by membranous material, means cooperating with said forming means for bending said frame member to provide adjacent corners of a substantially rectangular container, means for bending the free ends of said frame member to provide opposite adjacent corners of said substantially rectangular container and to dispose said free ends in overlapping relation, said last-named means comprising separately operated members engageable with said free ends, means for holding said free ends in overlapping relation, and means operable to effect a sealing of said adjacently disposed membranous material of said free ends while said last-named means is in said holding relation with said free ends.

13. In a machine for constructing merchandise containers, the combination of forming means adapted to receive a frame member enveloped by membranous material, means cooperating with said forming means for bending said frame member to provide adjacent corners of a substantially rectangular container, means for bending the free ends of said frame member to provide opposite adjacent corners of said substantially rectangular container and to dispose said free ends in overlapping relation, said last-named means comprising separately operated members engageable with said free ends, means for operating one of said last-named members to hold said free ends in said overlapping relation, and means operable to effect a sealing of said adjacently disposed membranous material of said free ends while said member is in holding relation with said free ends.

14. In a machine for constructing merchandise containers, the combination of forming means adapted to receive a frame member enveloped by membranous material, means cooperating with said forming means for bending said frame member to provide adjacent corners of a substantially rectangular container, means for bending the free ends of said frame member to provide opposite adjacent corners of said substantially rectangular container and to dispose said free ends in overlapping relation, said last-named means operating to form said overlapping of said free ends adjacent one of said last-named formed corners of said receptacle, and means for sealing the adjacently disposed membranous material of said overlapping ends on opposite surfaces of said frame member.

15. In a machine for constructing merchandise containers, the combination of forming means adapted to receive a frame member enveloped by membranous material, means cooperating with said forming means for bending said frame member to provide adjacent corners of a substantially rectangular container, means for bending the free ends of said frame member to provide opposite adjacent corners of said substantially rectangular container and to dispose said free ends in overlapping relation, said last-named means operating to form said overlapping of said free ends adjacent one of said last-named formed corners of said receptacle, and means for sealing the adjacently disposed membranous material of said overlapping ends on adjacent sides forming the corner of said frame member.

16. In a machine for constructing merchandise containers, the combination of forming means adapted to receive a frame member enveloped by membranous material, means cooperating with said forming means for bending said frame member to provide adjacent corners of a substantially rectangular container, means for bending the free ends of said frame member to provide opposite adjacent corners of said substantially rectangular container and to dispose said free ends in overlapping relation, said last-named means operating to form said overlapping of said free ends adjacent one of said last-named formed corners of said receptacle, and means for sealing the adjacently disposed membranous material of said overlapping ends on opposite surfaces of adjacent sides forming the corner of said frame member.

17. In a machine for constructing merchandise containers, the combination of means for supplying a frame member having a covering of membranous material inherently possessing the property of adhering to membranous material of similar character upon treatment by a sealing instrumentality, forming means adapted to pick up said frame member, means cooperating with said forming means to bend said frame member to provide adjacent corners of a substantially rectangular container, means for bending the free ends of said frame member to provide opposite adjacent corners of said substantially rectangular container and to dispose said free ends in overlapping relation, and means for treating the adjacently disposed membranous material of said overlapped ends to seal the same.

18. In a machine for constructing merchandise containers, the combination of means for successively supplying a frame member enveloped by membranous material at intervals into a given position, a plurality of forming means adapted to successively pick up said frame members at intervals, means cooperating with said forming means to successively bend said frame members to provide adjacent corners of substantially rectangular containers, means for successively bending the free ends of said frame members successively to provide opposite adjacent corners of said substantially rectangular containers and to dispose the free ends thereof in overlapping relation to one another, and sealing means successively operable to seal the adjacently disposed membranous material of the overlapped ends of said frame members, said last-named means operating to bend one of said free ends about one of said last-named corners.

19. In a machine for constructing merchandise containers, the combination of forming means adapted to receive a frame member having a covering of membranous material inherently possessing the property of adhering to membranous material of similar character upon treatment by a sealing instrumentality, means for overlapping the free ends of said frame members, means for treating the adjacently disposed membranous material of said overlapped ends to seal the same, means for disposing a piece of membranous material in juxtaposition to the membranous material of said frame member, and means for treating said last-named piece of membranous material to secure the same to said frame members to close one of the open ends thereof.

20. In a machine for constructing merchandise containers, the combination of forming means adapted to receive a frame member enveloped by membranous material, means cooperating with said forming means for bending said frame member to provide adjacent corners of a substantially rectangular container, means for bending the free ends of said frame member to provide opposite adjacent corners of said substantially rectangular container and to dispose said free ends in overlapping relation, means for sealing the adjacently disposed membranous material for said overlapped ends, and means for securing and sealing a piece of membranous material to the first-named membranous material of said frame member to close one of the open ends thereof.

21. In a machine for constructing merchandise containers, the combination of forming means adapted to receive a frame member having a covering of membranous material inherently possessing the property of adhering to membranous material of similar character upon treatment by a sealing instrumentality, means for overlapping the free ends of said frame members, means for treating the adjacently disposed membranous material of said overlapped ends to seal the same, means for disposing a piece of membranous material in juxtaposition to the membranous material of said frame member, means for treating said last-named piece of membranous material to secure the same to said frame members to close one of the open ends thereof, and means engaging said frame members to discharge the same from said forming means.

22. In a machine for constructing merchandise containers, the combination of means for supplying a frame member having a covering a membranous material, means for supplying membranous material to be attached to said frame member, and means for sealing said last-named membranous material to said membranous material enveloping said frame member to provide a closure member for one of the openings of said frame member.

23. In a machine for constructing merchandise containers, the combination of means for supplying a frame member enveloped by membranous material, means for supplying a continuous web of membranous material and positioning the same over one of the openings of said frame member, means for effecting an initial seal between said last-named membranous material and the membranous material enveloping asid frame member, and means for cutting said web, and means for completing the sealing of said last-named membranous material to said membranous material enveloping said frame member.

24. In a machine for constructing merchandise containers, the combination of means for supplying a frame member of plane construction enveloped by membranous material, means for forming a frame structure from said frame member, means for supplying membranous material to be attached to said frame member, and means for sealing said last-named membranous material to said membranous material enveloping said frame member to provide a closure member for one of the openings of said frame member.

25. In a machine for constructing merchandise containers, the combination of means for supplying a frame member of plane construction enveloped by membranous material, means for forming a frame structure from said frame member, means for supplying a continuous web of membranous material and positioning the same over one of the openings of said frame member, means for effecting an initial seal between said last-named membranous material and the membranous material enveloping said frame member, means for cutting said web, and means for completing the sealing of said last-named membranous material enveloping said frame member.

26. In a machine for constructing merchandise containers, the combination of means for progressively moving a plurality of frame structures including coverings of membranous material, means for supplying membranous material to be attached to said frame structure, simultaneously operated instrumentalities disposed in spaced relation, at least one of said instrumentalities effecting an initial seal between said second-named membranous material and the membranous material of one of said frame structures, and other of said instrumentalities effecting a complete sealing of said second-named membranous material to the membranous material of other of said frame structures.

27. In a machine for constructing merchandise containers, the combination of means for progressively moving a plurality of frame structures including coverings of membranous material, means for supplying a continuous web of membranous material and positioning the same over the progressively moving frame structures, simultaneously operated instrumentalities disposed in spaced relation, at least one of said instrumentalities effecting an initial seal between said second-named membranous material and the membranous material of one of said frame structures, one of said instrumentalities severing said web between certain other of said frame structures after said initial sealing, and other of said instrumentalities effecting a complete sealing of said second-named membranous material to the membranous material of other of said frame structures.

28. In a machine for constructing merchandise containers, the combination of means for supplying a frame structure of open end construction including a covering of membranous material, means for supplying membranous material to be attached to said first-named membranous material of said frame structure, and means for sealing said last-named membranous material to said first-named membranous material covering said frame structure to provide a closure member for one of the open ends of said frame structure.

29. In a machine for constructing merchandise containers, the combination of means for successively supplying pieces of material forming the frame of said containers, means for supplying and positioning webs of membranous material in juxtaposition with the upper and lower surfaces of said frame member, conveying means, said conveying means comprising pairs of rolls spaced apart a predetermined distance whereby said frame members are gripped by the second pair of rolls before release by the first pair of rolls, and means intermediate said pairs of rolls for simultaneously cutting and sealing the said webs of frame members gripped by both of said pairs of rolls.

30. In a machine for constructing merchandise containers, the combination of means for successively supplying pieces of material forming the frame of said containers, means for supplying and positioning webs of membranous material in juxtaposition with the upper and lower surfaces of said frame member, conveying means, said conveying means comprising a plurality of pairs of rolls spaced apart a predetermined distance whereby said frame members are gripped by each succeeding pair of rolls before released by the preceding pair of rolls, means intermediate certain pairs of rolls for simultaneously cutting and sealing the said webs of frame members gripped by the said pairs of rolls, and means associated with another pair of rolls for sealing the ends of said webs whereby said frame members are completely enveloped by said webs upon discharge from said rolls.

THOMAS McCOY.
JOSEPH L. ROSEFIELD.
MARVIN ROSEFIELD.

CERTIFICATE OF CORRECTION.

Patent No. 2,215,011.  September 17, 1940.

THOMAS McCOY, ET AL.

It is hereby certified that error appears in the printed specification of the above numbered patent requiring correction as follows: Page 3, first column, line 19, for the word "of" read --or--; page 9, first column, line 44, claim 22, for "a" last occurrence, read --of--; line 60, claim 23, for "asid" read --said--; and that the said Letters Patent should be read with this correction therein that the same may conform to the record of the case in the Patent Office.

Signed and sealed this 22nd day of October, A. D. 1940.

(Seal)

Henry Van Arsdale,
Acting Commissioner of Patents.